United States Patent
Thunuguntla et al.

(10) Patent No.: US 12,505,107 B2
(45) Date of Patent: *Dec. 23, 2025

(54) BATCH MATERIALIZATION USING ITERATIVE BROADCAST

(71) Applicant: Intuit Inc., Mountain View, CA (US)

(72) Inventors: Saikiran Sri Thunuguntla, Bengaluru (IN); Vishal Reddy Baddam, Bengaluru (IN); Rahul Mittal, Bangalore (IN); Sanket Sahu, Bangalore (IN); Kamesh Venkata Siva Bhallamudi, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,783

(22) Filed: Jun. 13, 2024

(65) Prior Publication Data

US 2025/0384047 A1    Dec. 18, 2025

(51) Int. Cl.
*G06F 16/2455* (2019.01)
*G06F 16/22* (2019.01)
*G06F 16/23* (2019.01)

(52) U.S. Cl.
CPC ...... *G06F 16/2456* (2019.01); *G06F 16/2246* (2019.01); *G06F 16/2358* (2019.01)

(58) Field of Classification Search
CPC ............. G06F 16/2456; G06F 16/2246; G06F 16/2358
See application file for complete search history.

(56) References Cited

U.S. PATENT DOCUMENTS

| 8,200,614 B2 | 6/2012 | Syed et al. |
| 8,818,944 B2 | 8/2014 | Chaliparambil et al. |
| 8,972,459 B2 | 3/2015 | Chaliparambil et al. |

(Continued)

FOREIGN PATENT DOCUMENTS

WO    WO-2012178072 A1 *  12/2012    ........... G06F 16/254

OTHER PUBLICATIONS

Kini, Simplifying Change Data Capture with Databricks Delta, pp. 1-19, Oct. 29, 2018.*

(Continued)

*Primary Examiner* — Albert M Phillips, III
(74) *Attorney, Agent, or Firm* — Paradice & Li LLP

(57) ABSTRACT

Systems and methods are described for batch materialization of an incremental change data capture (CDC) changeset. The primary keys are extracted from the incremental CDC changeset and are broadcast to a plurality of executors. By iteratively broadcasting the extracted primary keys in groups, each being a size that is less than a broadcast limitation, the full dataframe of extracted primary keys is broadcast to the executors. Each executor filters a baseline data table based on the extracted primary keys to generate a baseline match dataframe with all primary keys matching the extracted primary keys, and a baseline unmatched dataframe with all primary keys not matching the extracted primary keys. Each executor receives a partitioned incremental CDC changeset and applies the changes to the baseline match dataframe to produce a baseline change dataframe, which is merged with the baseline unmatched dataframe to produce a final changed baseline data table.

18 Claims, 8 Drawing Sheets

(56) References Cited

U.S. PATENT DOCUMENTS

| | | |
|---|---|---|
| 9,513,811 B2 | 12/2016 | Wein et al. |
| 10,963,435 B1 | 3/2021 | McAlister et al. |
| 11,308,079 B2 | 4/2022 | Deshpande et al. |
| 12,019,651 B2 | 6/2024 | Nochlin |
| 12,216,654 B2 | 2/2025 | Akidau et al. |
| 2009/0276449 A1 | 11/2009 | Syed et al. |
| 2016/0162506 A1 | 6/2016 | Li et al. |
| 2018/0203919 A1 | 7/2018 | Mackay et al. |
| 2022/0156279 A1 | 5/2022 | Nochlin |
| 2024/0256569 A1 | 8/2024 | Muller et al. |
| 2024/0378204 A1 | 11/2024 | Hottelier et al. |
| 2025/0036389 A1 | 1/2025 | Patel et al. |

OTHER PUBLICATIONS

Turaga, How to Simplify CDC With Delta Lake's Change Data Feed, pp. 1-8, Jun. 9, 2021.*

Chadha, Data Engineering with Databricks Cookbook Chapter 3, pp. 1-46, May 2024.*

Shrivastava, Anshumali, "Lecture 5: Compressed Cache and Bloom Filters," Comp 480/COMP580—Probabilistic Algorithms and Data Structures, Sep. 6, 2022, 4 pages.

S. Fischer-Hubner and N. Hopper (Eds.), "A Constraint Satisfaction Cryptanalysis of Bloom Filters" PETS 2011, LNCS 6794, pp. 226-245, 2011.

* cited by examiner

BATCH MATERIALIZATION USING ITERATIVE BROADCAST

BACKGROUND

Materialization is a process of merging changes, such as inserts, updates, and deletes, from input data sources to a destination data source, e.g., a physical storage medium, such as a disk or memory. Materialization has particular significance in the context of large-scale data processing and transformation operations. For example, in a distributed data processing system, such as Apache Spark, data may go through a series of transformations, in which each transformation, e.g., insert, update, or delete, may generate an intermediate dataset. Materialization takes in changes from sources, such as Online Transaction Processing (OLTP) sources, and merge these changes into a centralized repository. OLTP sources, by way of example, may execute a number of transactions concurrently, such as in online shopping, order entry, banking, sending text messages, etc. These transactions typically involve inserting, updating, and/or deleting small amounts of data, which are recorded and secured so that an enterprise can access the information anytime for reporting or analyzing.

Batch materialization may take changes from sources, such as OLTP sources, and merges these changes into a data lake tables, which may store, process, and secure large amounts of structured, semi-structured, and unstructured data. The data lake tables typically use a formats optimized for analytics and big data processing. During the merge process, the baseline tables are loaded into memory, changes are applied with a merge process, and the updated data frame is written to a new Snapshot location. The data lake table is then updated to point to the new snapshot location. During the merge process, two datasets may be joined and merge logic applied for the updates. The merge logic may require a large amount of data to be shuffled across executors in Cluster and largely leverages disk reads and writes. As a result, finishing the merge logic on a large cluster for a single update may require hours, for which there is no control over the time taken and presents a risk of missing agreed upon service times per service-level agreements (SLAs).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

As discussed herein, batch materialization of an incremental change data capture (CDC) changeset may be performed by a distributed computing architecture for large database without requiring the use of a shuffle operation. The primary keys from the incremental CDC changeset are extracted and are broadcast to a plurality of executors. The dataframe for the extracted primary keys, however, may be greater than a broadcast limitation of the distributed computing architecture. By iteratively broadcasting the extracted primary keys in groups, each group having a size that is less than the broadcast limitation, the full dataframe of extracted primary keys may be broadcast to the executors. Each executor filters a baseline data table based on the extracted primary keys to generate a baseline match dataframe and a baseline unmatched dataframe. In the baseline match dataframe all primary keys match the extracted primary keys, and in the baseline unmatched dataframe all primary keys do not match the extracted primary keys. Each executor receives a different partitioned portion of the incremental CDC changeset and merges the changes with the baseline match dataframe. The incremental changes in the CDC changeset are then applied to the baseline matched dataframe, thereby generating a baseline change dataframe. The baseline change dataframe is then merged with the baseline unmatched dataframe to produce a final changed baseline data table, which is then stored in a data lake.

One innovative aspect of the subject matter described in this disclosure can be implemented as a method performed by a computer system configured for batch materialization. The method includes receiving an incremental change data capture (CDC) changeset including a plurality of primary keys associated with corresponding data changes that include at least one of additions, updates, and deletes. The primary keys are extracted from the incremental CDC changeset and groups of the extracted primary keys are iteratively broadcast to each of a plurality of executors. A baseline data table is filtered, by each executor, based on the extracted primary keys to produce a baseline match dataframe and a baseline unmatched dataframe. All primary keys in the baseline match dataframe match the extracted primary keys and all primary keys in the baseline unmatched dataframe do not match the extracted primary keys. A different subset of the incremental CDC changeset is provided to each of the plurality of executors, and each executor applies changes in a received subset of the incremental CDC changeset to the baseline match dataframe to produce a baseline change dataframe. The baseline change dataframe is merged with the baseline unmatched dataframe to produce a final changed baseline data table, which is stored in a data lake.

One innovative aspect of the subject matter described in this disclosure can be implemented as a computer system configured for batch materialization. The computer system includes one or more processors and a memory communicatively coupled with the one or more processors and storing instructions that, when executed by the one or more processors, causes the computer system to perform operations for batch materialization. The one or more processors are configured to receive an incremental change data capture (CDC) changeset including a plurality of primary keys associated with corresponding data changes that includes at least one of additions, updates, and deletes. The one or more processors are configured to extract the primary keys from the incremental CDC changeset and iteratively broadcast groups of the extracted primary keys to each of a plurality of executors. The one or more processors are configured to filter, by each executor, a baseline data table based on the extracted primary keys to produce a baseline match dataframe and a baseline unmatched dataframe. All primary keys in the baseline match dataframe match the extracted primary keys and all primary keys in the baseline unmatched dataframe do not match the extracted primary keys. The one or more processors are configured to provide a different subset of the incremental CDC changeset to each of the plurality of executors and to apply, by each executor, changes in a received subset of the incremental CDC changeset to the baseline match dataframe to produce a baseline change dataframe. The one or more processors are configured to merge the baseline change dataframe with the baseline unmatched dataframe to produce a final changed baseline data table and to store the final changed baseline data table in a data lake.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
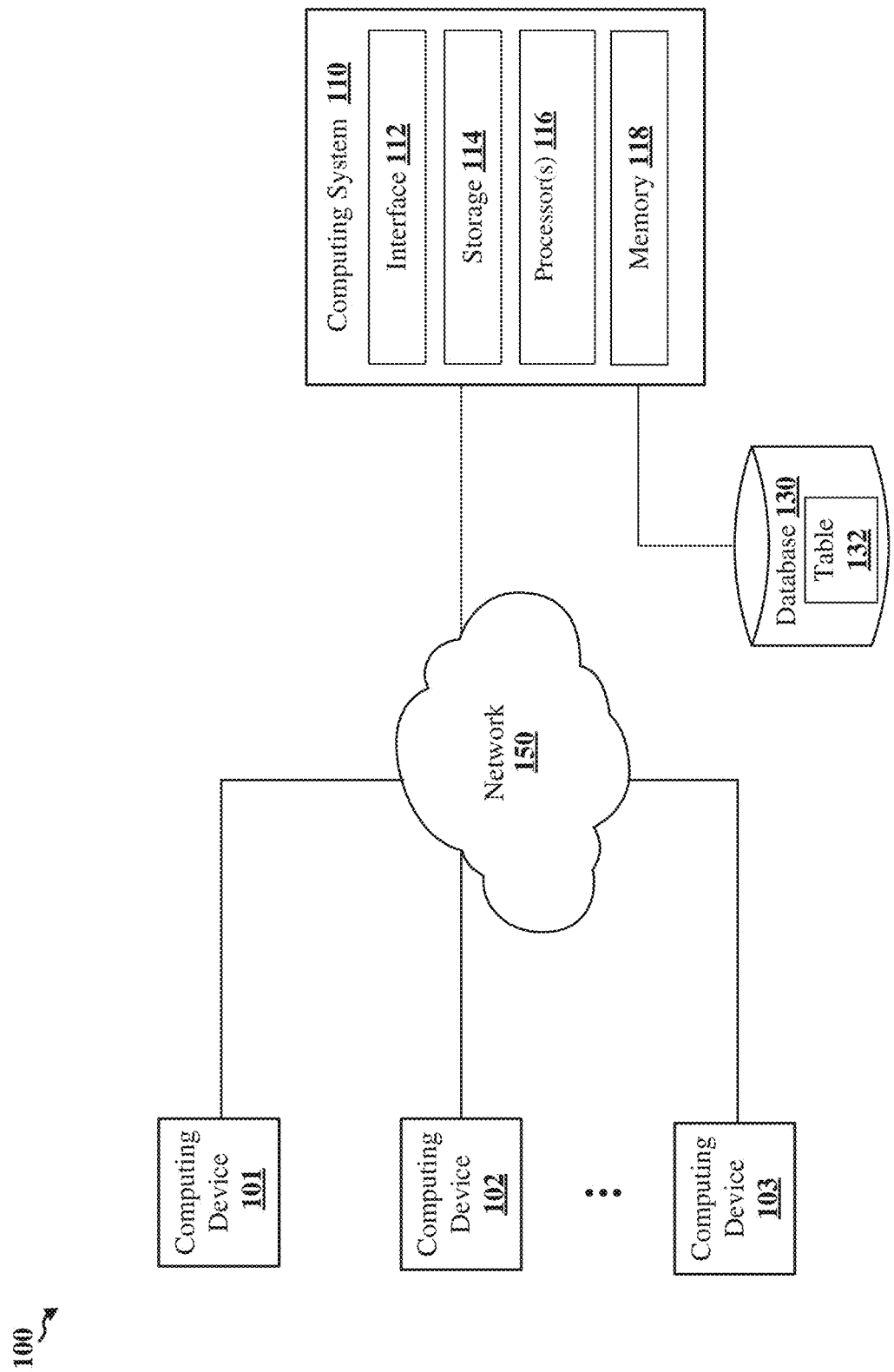
FIG. 1 shows a diagram of a network environment, within which aspects of the present disclosure can be implemented.

Implementations of the subject matter described in this disclosure allow for batch materialization of large datasets in a distributed computing architecture without requiring the use of a shuffle operation. A shuffle operation redistributes or reorganizes data across partitions of a distributed dataset. For large datasets, the shuffle operation is a resource intensive and time consuming operation. For example, merging a change data capture (CDC) changeset with a baseline dataset of 80 TB may require hours to perform, rendering periodic materialization expensive and extremely resource intensive.

The current subject matter includes a number of aspects that can be applied individually or in combinations of one or more such aspects to support a unified database table approach that integrates the performance advantages of in-memory database approaches with the reduced storage costs of on-disk database approaches. The current subject matter, for example, can be implemented in systems utilizing a data lake, data warehouse, database, or other similar repository system to store process and secure large amounts of data, which are sometimes referred to herein as a data lake or database systems. The current subject matter may be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Implementations described herein enable batch materialization of a CDC changeset with a baseline data lake by filtering the baseline data lake into separate dataframes. One dataframe, a baseline match dataframe, includes only data that is in the CDC changeset, while the other dataframe, a baseline unmatched dataframe, includes only data that is not in the CDC changeset. The filtering of the baseline data lake into the separate dataframes is performed based on only the primary keys from CDC changeset. The primary keys, for example, may be extracted from the CDC changeset and broadcast to a plurality of executors in the distributed computing architecture.

The distributed computing architecture may have a hard limit to the size of a dataframe that may be broadcast to executors. With a large CDC changeset, the dataframe of extracted primary keys may exceed the broadcast limitation. In some implementations, the extracted primary keys may be compressed to reduce the size of the dataframe to be broadcast. The extracted primary keys may be iteratively broadcast in groups, each group having a size that is less than the broadcast limitation. The executors may combine the groups of extracted primary keys to generate the dataframe of extracted primary keys, which may then be used to filter the baseline data lake. Accordingly, the hard limitations to the size of broadcast is not violated and each executor receives a list of all primary keys from the CDC changeset.

The CDC changeset may be partitioned and distributed to the executors so that each executor receives a different subset of the incremental CDC changeset. In some implementations, the CDC changeset may be compressed prior to partitioning and distributing to the executors. For example, the changeset may be consolidated to combine multiple entries while retaining the latest changes. Each executor then merges the changes from its respective subset of the CDC changeset with the baseline match dataframe and the resulting baseline change dataframes are then merged with the baseline unmatched dataframe to produce the final merged dataset. Because of the broadcasting of the extracted primary keys, no shuffle operation is required to complete the merge operation with the CDC changeset, thereby significantly reducing the resources and time required to complete the operation. Accordingly, the materialization process may be completed in an efficient and timely manner.

Based on one or more of the foregoing, a solution is provided that enables a fast, resource efficient, and cost-effective, i.e., less processing and reduced resources, materialization of changesets with a baseline data lake. Aspects of the subject matter disclosed herein are not a mental process that can be performed in the human mind, for example, because the human mind is not practically capable of performing operations such as extracting and iteratively broadcasting primary keys from a CDC changeset to a number of executors. Moreover, the human mind is not practically capable of performing operations of a plurality of executors in a distributed computing architecture, such as filtering a baseline data table as discussed herein and applying changes from different subsets of the incremental CDC changeset received by each executor to a baseline dataframe, as discussed herein, or combining the resulting dataframes to produce a final baseline data table and storing the final baseline data table in a data lake.

Additionally, aspects of the subject matter disclosed herein are integrated into a practical application to improve the functioning of the computer system and database technology. As discussed herein, aspects of the subject matter disclosed herein enable materialization of large datasets without requiring an expensive and time consuming shuffle operation. For example, through the broadcast of primary keys and filtering of the baseline data table into separate dataframes, a baseline match dataframe and a baseline unmatched dataframe, partition and distribution of the baseline data table to the plurality of executors is avoided and the changes from the CDC changeset may be applied to a significantly smaller baseline dataframe without requiring shuffling. Moreover, hard broadcast limits in the distributed computing architecture are avoided by extracting the primary keys from the CDC changeset, which may be compressed, and are iteratively broadcast in groups with sizes smaller than the broadcast limit. Consequently, the materialization of the CDC changeset may be performed with less resources and significantly faster than may be accomplished using conventional computer systems and database technologies.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The subject matter described herein may be implemented as a core software platform of an enterprise resource planning (ERP) system, other business software architecture, or other data-intensive computing application or software architecture that runs on one or more processors that are under the control of a specific organization.

FIG. 1 shows a diagram of a network environment 100 within which aspects of the present disclosure can be implemented. In one or more implementations, one or more of the modules and elements shown in FIG. 1 may be omitted, repeated, and/or substituted. Accordingly, implementations should not be considered limited to the specific arrangements of modules shown in FIG. 1.

The network environment 100 may include is shown to include multiple client machines 101, 102, and 103, a computing system 110, a database 130 sometimes referred to as data lake 130, and a communication network 150. Although only three client machines 101-103 are shown in the example of FIG. 1, in other implementations, any suitable number of client machines may access the computing system 110 via a direct connection, a local terminal, or over the communication network 150, which may be a local area network, a wide area network, a wireless network, the Internet, or any other suitable wired or wireless network.

The computing system 110 is shown to include an interface 112, computer-readable storage medium 114, one or more processors 116, and memory 118 coupled to the one or more processors 116. In some implementations, the various components of the computing system 110 may be interconnected by a data bus, which may be any known internal or external bus technology, including but not limited to ISA (Industry Standard Architecture), EISA (Extended Industry Standard Architecture), PCI (Peripheral Component Interconnect), PCI Express, NuBus, USB (Universal Serial Bus), Serial ATA (Serial Advanced Technology Attachment), or FireWire. In other implementations, the various components of the computing system 110 may be interconnected using other suitable signal routing resources, for example, the components may be distributed among multiple physical locations and coupled by a network connection.

The one or more processors 116 may include one or more suitable processors capable of executing scripts or instructions of one or more software programs stored in computing system 110 (such as within a computer-readable storage medium 114 and in memory 118) and that once programmed pursuant to instructions stored in memory operates as a special purpose computer to perform the various functions discussed herein. For example, the one or more processors 116 may be capable of executing instructions causing the one or more processors 116 to perform batch materialization by ingesting and merging data changes into a data lake table 132 in data lake 130, as discussed herein. The one or more processors 116 may include a single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the one or more processors 116 may include a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

The memory 118 may be any memory (such as RAM, flash, etc.) that temporarily or permanently stores data, such as any number of software programs, executable instructions, machine code, algorithms, and the like that can be executed by the one or more processors 116 to perform one or more corresponding operations or functions. In some implementations, the memory 118 may be connected directly to or integrated with the one or more processors 116, e.g., as a processing in memory (PIM) chip. The memory 118, for example, may be a computer-readable medium that participates in providing instructions to the one or more processors 116, directly or via intermediate memory, for execution, including without limitation, non-volatile storage media (e.g., optical disks, magnetic disks, flash drives, etc.), or volatile media (e.g., SDRAM, ROM, etc.). In some implementations, hardwired circuitry may be used in place of, or in combination with, software instructions to implement aspects of the disclosure. As such, implementations of the subject matter disclosed herein are not limited to any specific combination of hardware circuitry and/or software.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. A computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

The features of the computing system 110 may be implemented in a system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computing system 110 may include clients and servers. A client and server may generally be remote from each other and may typically interact through a network. The relationship of client and server may arise by virtue of computer programs running on the respective computers and having a client-server relationship with each other.

Figure 2:
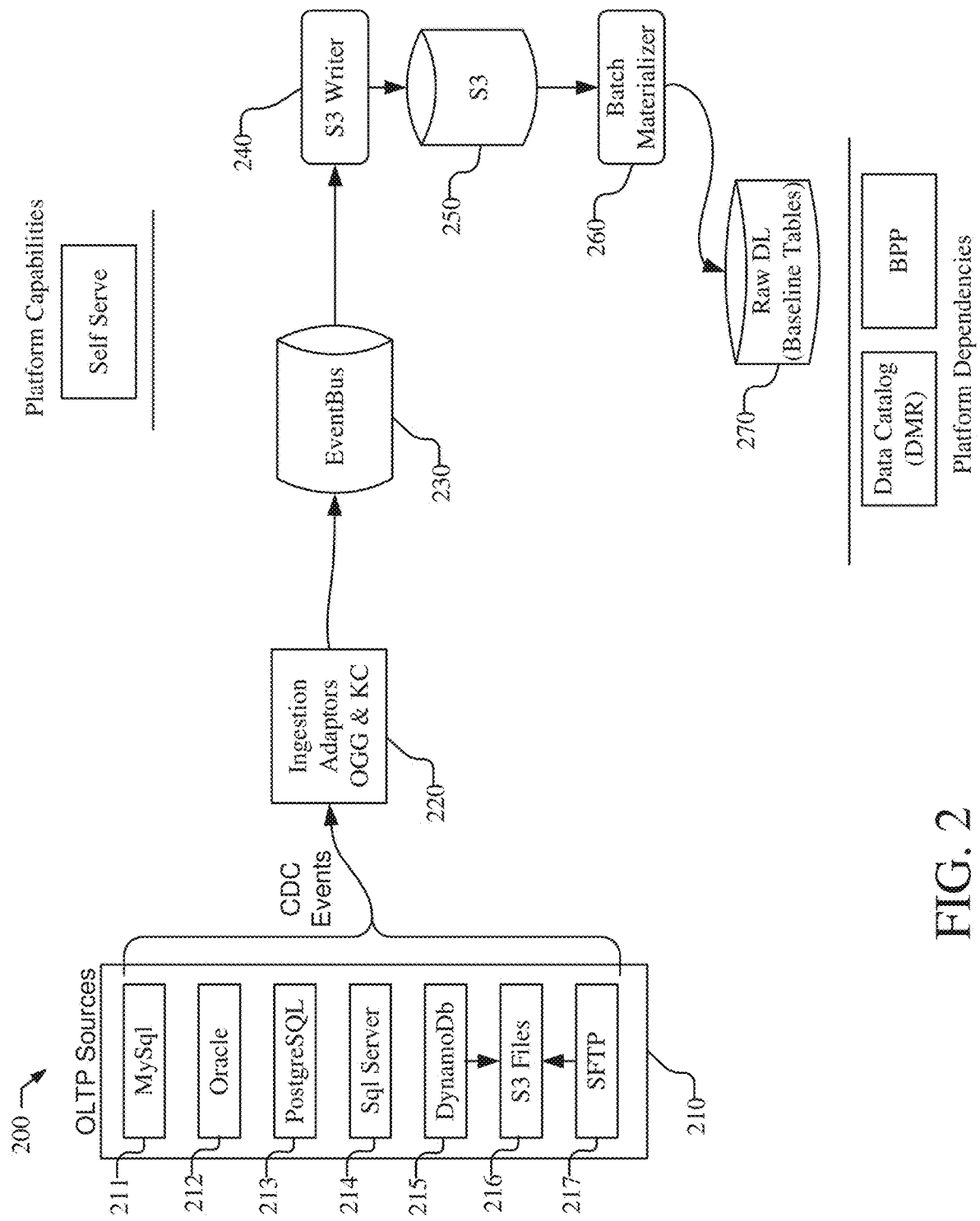
FIG. 2 shows a high level architecture for an ingestion platform, which may be implemented in the network environment shown in FIG. 1, within which aspects of the present disclosure can be implemented.

FIG. 2 shows a high level architecture for an ingestion platform 200, which may be implemented in the network environment 100 and specifically within computing system 110 shown in FIG. 1. The ingestion platform 200 may perform batch materialization within which aspects of the present disclosure can be implemented. As illustrated, the ingestion platform 200 may include self-serve capabilities that provides a user interface (UI) by which information related to data ingestion is provided, such as the schema of data table, the desired frequency of the ingestion process, the location that tables are written to the database (data lake), how the tables will be accessed, etc. Additionally, platform dependencies include a data catalog that maintains the metadata of the system, such as the schema of the tables ingested, and batch processing platform (BPP) for scheduling the start of ingestion processes.

As illustrated, change data capture (CDC) events, sometimes referred to herein as a changeset, is captured from one or more data lakes, e.g., OLTP sources 210, by ingestion adaptors 220, such as Oracle Golden Gate (OGG) or Kafka Connect (KC). The OLTP sources 210, for example, may include data lakes such as MySQL 211, Oracle 212, PostgreSQL 213, SQL Server 214, Amazon DynamoDb 215, Secure File Transfer Protocol (SFTP) 216, and S3 Files 217. Additional or alternative OLTP sources 210 may provide changesets to the ingestion adaptors 220. The changeset is provided to and temporarily stored by an EventBus 230. The EventBus 230, for example, may serve as a router that receives the changesets and delivers them to a desired destination, e.g., S3 writer 240. The S3 writer 240 writes the changes to an S3 bucket 250. The batch materializer 260 periodically takes changes from the S3 bucket 250 and merges the changeset with the baseline table from the raw database (data lake) 270 loaded into memory and then creates a new snapshot. The batch materializer 260, for example, applies the changes in the changeset to the baseline table, e.g., inserts, updates, and deletes, and writes as a new table with a new snapshot location in the data lake 270. After this, the data table is updated to point to new snapshot location. By default, a number of snapshot locations may be maintained to go back in time if there is any data issue in the latest snapshot.

Figure 3:
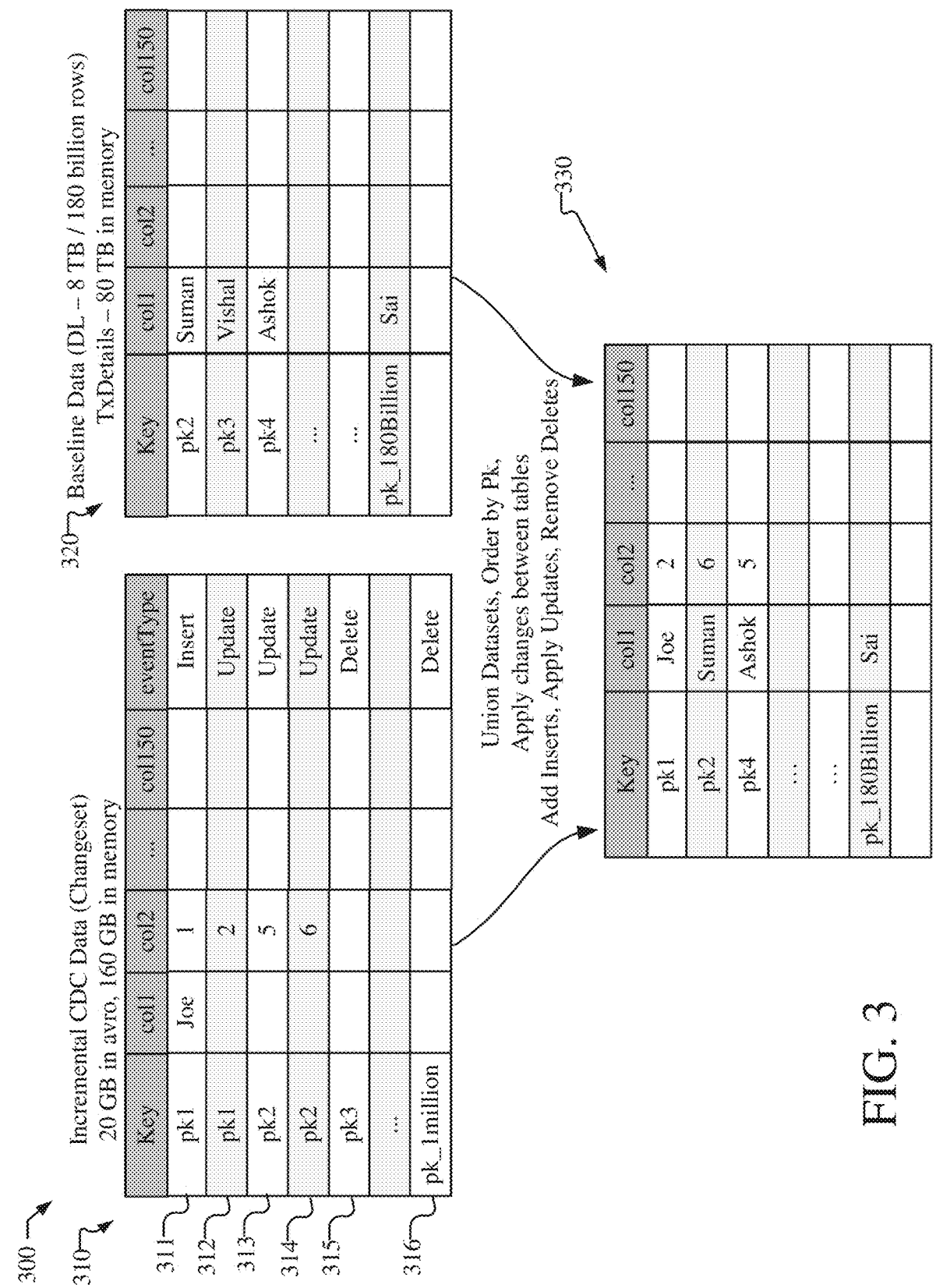
FIG. 3 shows a high level illustration of a materialization process.

FIG. 3 is a high level illustration of a materialization process 300. During the materialization process, incremental CDC data, sometimes referred to as an incremental CDC changeset or simply changeset 310, is merged with the baseline data table 320 from the data lake.

The changeset 310, by way of example, may be in columnar format, including a column representing the primary key (Key), a number of data columns (col1, col2, . . . col150) and a column representing the type of event (eventType), e.g., insert, update, or delete. The primary key is a constraint on the baseline data table 320 that defines a set of columns. The primary key has values (pk1, pk2 . . . ) that uniquely identify a row in the baseline data table 320. A row associated with an insert eventType may include data for multiple or all columns in the row associated with a new primary key, a row associated with an update eventType may include only the updated data associated with an established primary key, and a delete eventType may not have any data associated with an established primary key. Incremental CDC data may include a relatively small amount of data, e.g., a few rows, or may contain a large amount of data, e.g., millions or rows, and for example, may be 20 GB in Avro compression format and 160 GB in memory.

The changeset 310 may include multiple instances of a primary key if data associated with that primary key is changed at different times. The rows may be time stamped, ordered, or otherwise indicate the order of changes. For example, the first row 311 of the changeset 310 is associated with an insert eventType for primary key pk1 and may include data for the full row, e.g., the data for in col1 (Joe) and the data for column col2 (1). The second row 312 of the changeset 310 is also associated with primary key pk1 indicating there is an update to the numerical value of column col2 (2). The third row 313 of the changeset 310 is associated with an update of the numerical value in column col2 (5) for a different primary key pk2. The fourth row 314 of the changeset is also associated with primary key pk2, and indicates an update of the numerical value in column col2 (6). Rows 315 and 316 of the changeset 310 indicate a delete of the row associated with primary keys pk3 and pk_1million, respectively.

The baseline data table 320 is the table from the database (data lake) that includes previously acquired data (and is thus referred to as the baseline data), to which the changeset 310 is to be merged to produce the changed baseline data table 330. The baseline data table 320 may include a large amount of data, e.g., 180 billion rows, and may include 8 TB stored in a compressed format, e.g., Parquet format, in the data lake and 80 TB in memory. The baseline data table 320, for example, may be in columnar format, including a column representing the primary key (Key), and a number of data columns (Col1, Col2, . . . . Col150). While baseline data table 320 illustrated data only in column col1, it should be understood that the baseline data table 320 may include data in each column of each row.

Using a simple merge logic, the changeset 310 may be merged into the baseline data table 320 by union of the data, e.g., by appending the rows from the changeset 310 to the baseline data table 320, ordering the combined data by the primary key, and applying the changes as indicated by eventType, e.g., add inserted rows, apply latest updates to rows, and remove deleted rows to produce the changed baseline data table 330. As discussed above, however, the size of the changeset 310 and baseline data table 320 may be large, e.g., baseline data table 320 may be 80 TB, and as a result, the use of simple merge logic is inefficient and resource intensive.

In order to merge large changeset with a large baseline dataset, a shuffle operation is performed. The shuffle operation is a process of redistributing or reorganizing data across partitions of a distributed dataset, such as performed in an Apache Spark™ architecture.

Figure 4:
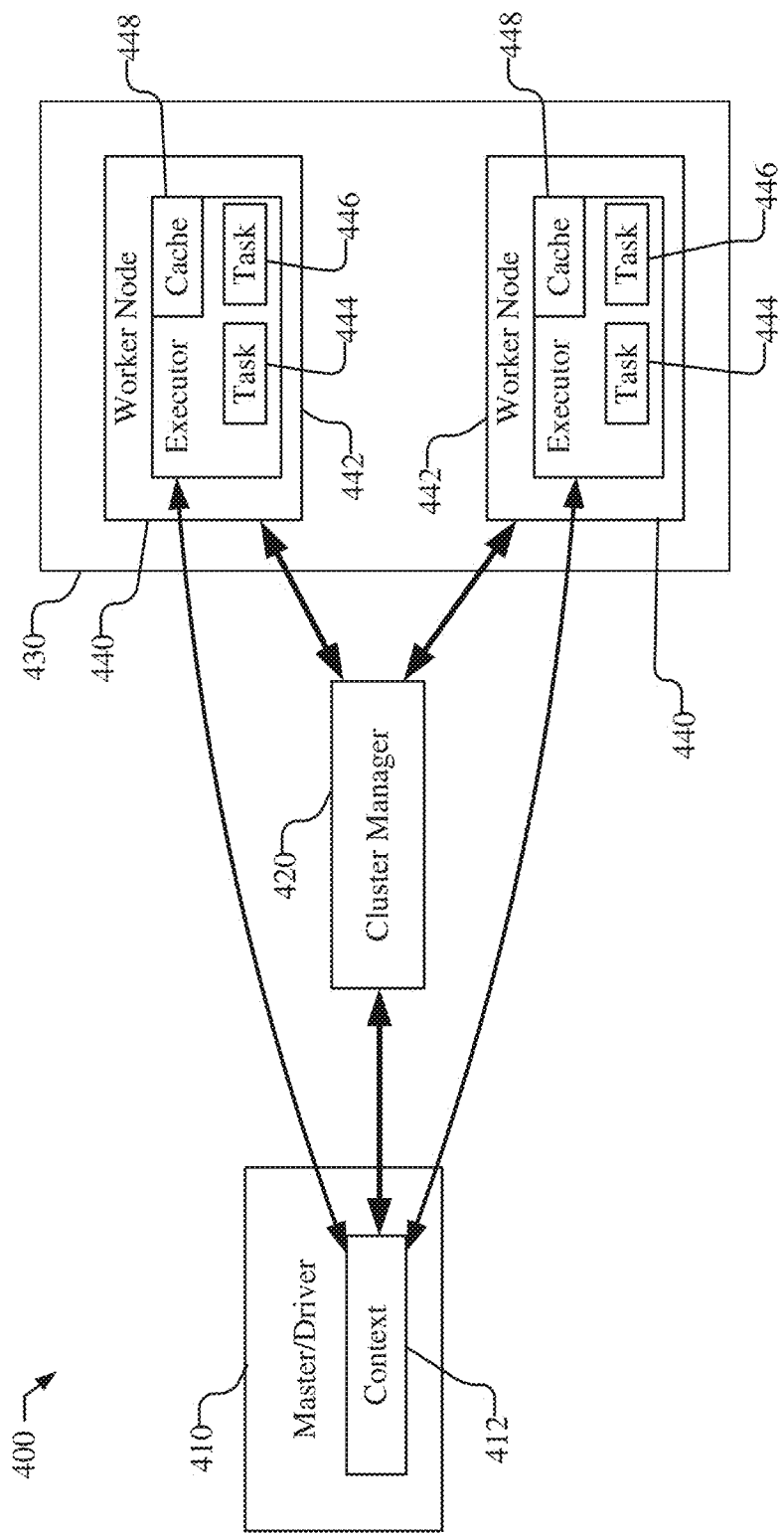
FIG. 4 shows an illustration of a distributed computing architecture, within which aspects of the present disclosure may be implemented.

FIG. 4, by way of example, is an illustration of a distributed computing architecture 400, such as an Apache Spark™ architecture, within which aspects of the present disclosure may be implemented. While the architecture 400 is described in reference to Apache Spark™, it should be understood that the implementation of the present disclosure is solely limited to this specific architecture, but that may be used in any architecture in which a shuffle type operation is used to merge large datasets.

The framework for the distributed computing architecture 400 uses a master-slave type framework, which includes a driver 410, and a cluster 430 with a number of worker nodes 440. The driver 410, for example, may operate as the master node, and runs programs or processes that are responsible for coordinating the execution of the desired application. The driver 410, for example, runs the main function for the architecture and creates the context 412 that connects to a cluster manager 420. The context 412, e.g., SparkContext, is the entry point for desired functionality. The context 412 represents the connection to the cluster 430 and may be used for the creation of Resilient Distributed Datasets (RDDs), accumulators, and broadcast variables. The context 412, may also be used to coordinate execution of tasks.

The cluster manager 420 may be responsible for the allocation of resources and management of the cluster 430 on which the application runs. For example, with use of Apache Spark™ various cluster managers may be supported, such as Apache Mesos, Hadoop YARN, and standalone cluster manager.

With the cluster 430 are a plurality of worker nodes 440. Within each worker node 440, one or more executors 442 are employed. For example, each worker node 440 may include 3 executors 442, although FIG. 4 illustrates only a single executor for the sake of simplicity. The executors 442 are worker processes that are responsible for execution of tasks 444 and 446 in the application. Each executor may run multiple tasks at a time, based on the number of cores, i.e., CPU cores, that each executor has. The executors 442 are launched on the worker nodes 440 and communicate with the driver 410 and cluster manager 420. The executors 442 run tasks 444 and 446 concurrently with each other enabling parallel processing, and store data in memory 448 or disk for caching and intermediate storage. The task 444 or 446, for example, may be the smallest unit of work in the application, and may represent a unit of computation that can be performed on a single partition of data. Each executor may work on one partition at a time in parallel with other executors working on other partitions. The driver 410 divides a job into the tasks and assigns the tasks to the executors 442 for execution.

Figure 5A:
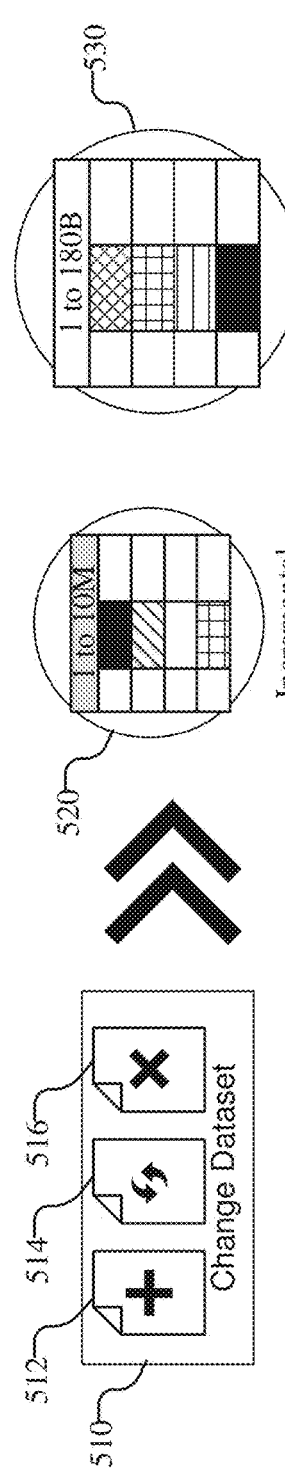
FIGS. 5A and 5B show an illustration of a shuffle operation for large datasets that may be performed by a plurality of executors.
Figure 5B:
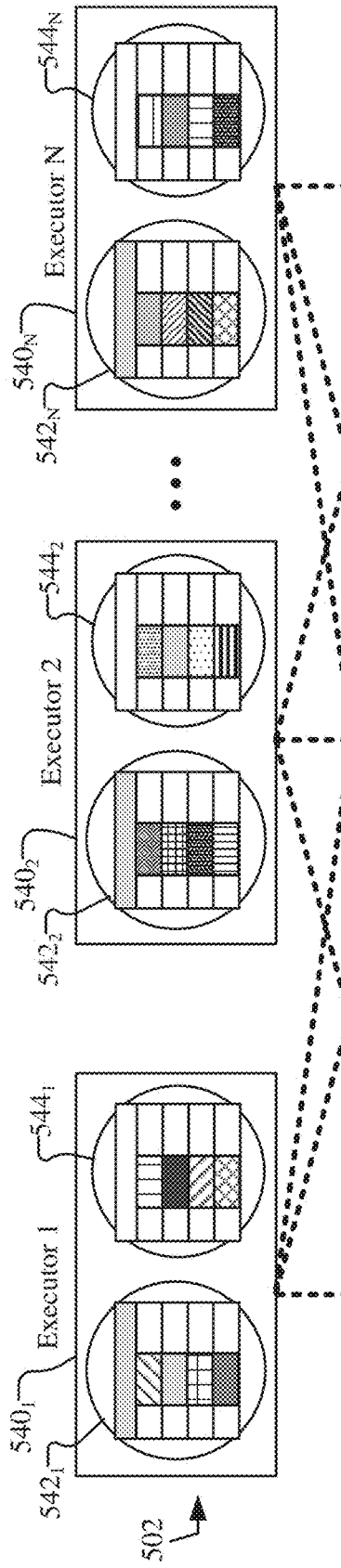

FIGS. 5A and 5B illustrates a shuffle operation that may be performed by a plurality of executors in order to merge large datasets, such as a changeset with a baseline dataset illustrated in FIG. 3. The shuffle operation is a process of redistributing or reorganizing data across partitions of a distributed dataset, which may be performed by a distributed computing architecture, such as illustrated in FIG. 4.

As illustrated in FIG. 5A, a change dataset 510, including changes such as additions 512, updates 514, and deletes 516, which is formatted as the incremental dataset 520 is to be merged with a baseline dataset 530. The incremental dataset 520 is the incremental CDC changeset in table format with a large amount of data, e.g., 10M rows, and for illustration shows different primary keys in one column using different hatching. The baseline dataset 530 is the baseline data table is the table from the data lake in table format and has an even larger amount of data, e.g., 180B rows, and also for illustration shows different primary keys in one column using different hatching. The incremental dataset 520 and the baseline dataset 530, thus, may be large datasets, e.g., 16 GB and 80 TB, respectively.

To merge the data from the incremental dataset 520 and the baseline dataset 530, a distributed computing architecture, such as the architecture 400 illustrated in FIG. 4, will split the work across the cluster, allowing for parallel processing amongst the executors. As illustrated in FIG. 5B, the entirety of the incremental dataset 520 and the entirety of the baseline dataset 530 are partitioned into smaller chunks and distributed across all of the executors $540_1$, $540_2$, . . . $540_N$, (sometimes collectively referred to as executors 540). With large datasets, a large number N of executors may be used, e.g., 500. After partitioning and distributing the incremental dataset 520 and the baseline dataset 530, each executor 540 will have a different portion of the incremental dataset 520 and the baseline dataset 530. For example, as illustrated in the first row 502 of FIG. 5B, the first executor $540_1$ has an incremental dataset portion $542_1$ and a baseline dataset portion $544_1$, while the second executor $540_2$ has an incremental dataset portion $542_2$ and a baseline dataset portion $544_2$, and the Nth executor $540_N$ has an incremental dataset portion $542_N$ and a baseline dataset portion $544_N$. The full incremental dataset 520 and the baseline dataset 530 are distributed amongst the executors 540, i.e., incremental dataset portions $542_1$-$542_N$ (sometimes referred to herein as incremental dataset portions 542) are the full incremental dataset 520 and baseline dataset portions $544_1$-$544_N$ (sometimes referred to herein as baseline dataset portions 544) are the full baseline dataset 530.

As discussed in reference to FIG. 3, to merge datasets, each executor 540 will join (union) its respective partition of datasets, e.g., by appending its respective partition of the incremental dataset 520 and the baseline dataset 530, and ordering the combined data by primary key, before applying the change indicated in the incremental dataset 520, i.e., addition, update, and delete. As illustrated by the different hatching in the incremental dataset portions 542 and the baseline dataset portions 544, the primary keys of the incremental dataset portions 542 and the baseline dataset portions 544 in each executor 540 may not match. For example, a primary key in an incremental dataset portion 542 of one executor may match the primary key in the baseline dataset portions 544 of a different executor. Accordingly, the ordering of the combined data by primary key in each executor 540 will not provide a useful result and the merge function will fail.

Conventionally, as illustrated by the dotted arrows, a shuffle operation is performed to redistribute the data so that the matching primary keys are present in each executor. Thus, as illustrated in the second row 504 of FIG. 5B, after the shuffle operation, the first executor $540_1$ has an incremental dataset portion $543_1$ and a baseline dataset portion $545_1$ that include matching primary keys (as illustrated with the matching hatching), while the second executor $540_2$ likewise has an incremental dataset portion $543_2$ and a baseline dataset portion $545_2$ with matching primary keys, and the Nth executor $540_N$ has an incremental dataset portion $543_N$ and a baseline dataset portion $545_N$ with matching primary keys. The merge operation may then be performed by each executor 540 in parallel, including ordering the combined data based on primary key after joining (union) incremental dataset portions and baseline dataset portions, and followed by applying the indicated changes. The merged data portions from each executor may then be combined written as a new table with a new snapshot location in the data lake.

As illustrated by the dotted arrows, however, the shuffle operation may require each executor to move a portion of its data to many different or all other executors, and to receive data from many different or all other executors, thus, requiring many disk reads and writes. The shuffle operation, for example, may require moving the entire baseline dataset across the cluster between the executors. With an 80 TB baseline dataset, the shuffle operation may require moving up to 80 TB across the cluster, which is an expensive operation. Completing a merge using a shuffle operation, for example, may require a significant amount of time to perform (e.g., hours) and is extremely resource intensive. There is no control over the time required to perform the operation, which presents an unacceptable risk of missing agreed upon service times per service-level agreements (SLAs).

Accordingly, it is desirable to reduce or eliminate the need for the shuffle operation to improve the functioning of the computer system and database technology for performing the materialization process. By eliminating the shuffle operation that is currently required for merging large datasets, the materialization process may be performed with significantly less disk reads and writes, less resources and significantly faster.

Figure 6:
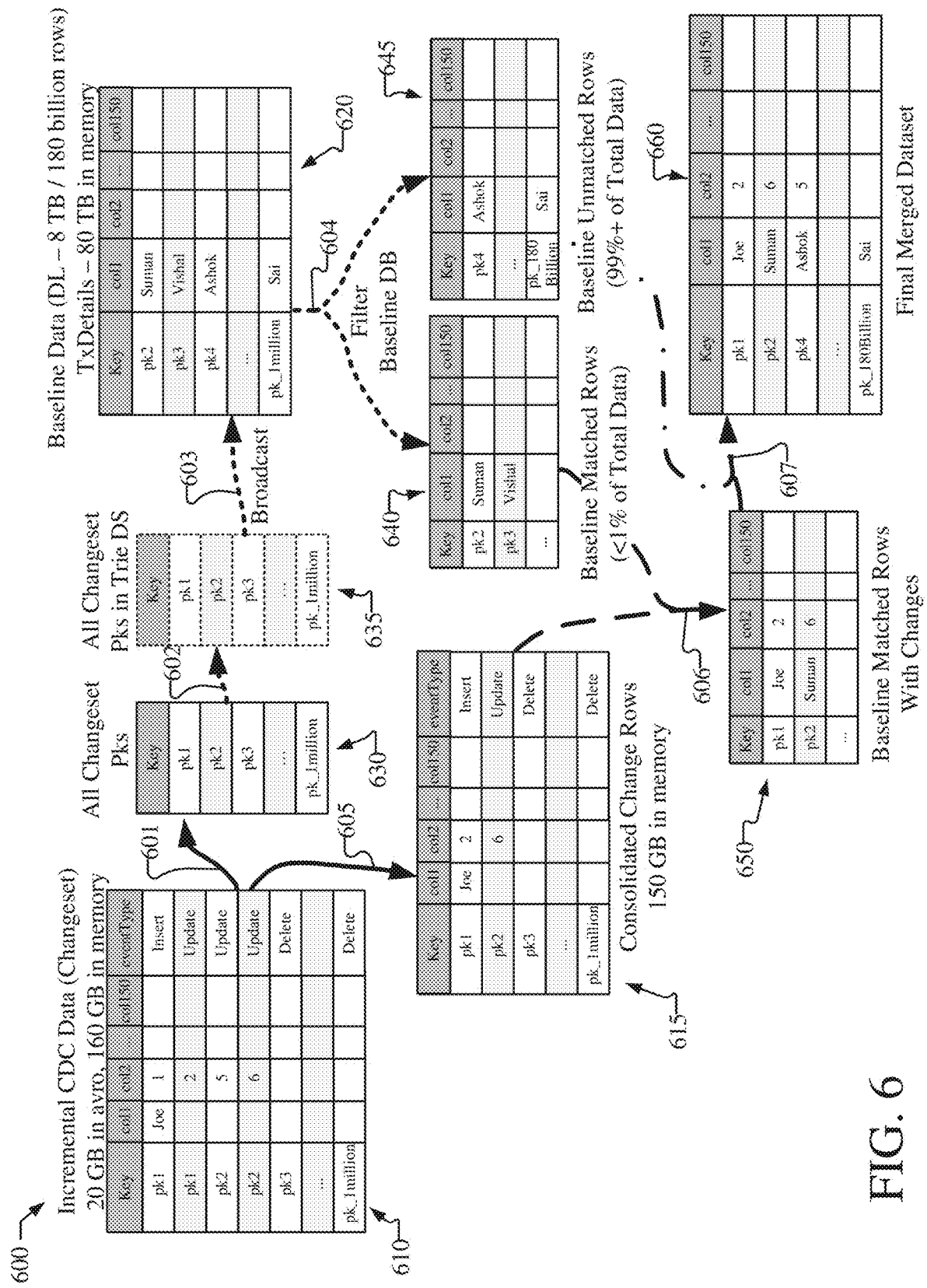
FIG. 6 shows an illustration of a materialization process in accordance with aspects of the present disclosure.

FIG. 6 is an illustration of a materialization process 600 in accordance with aspects of the present disclosure. During the materialization process 600, incremental CDC data, sometimes referred to as an incremental CDC changeset or simply changeset 610, is merged with the baseline data table 620 from the data lake. The materialization process 600 may be performed by an ingestion platform, such as ingestion platform 200 shown in FIG. 2 implemented in the network environment 100 shown in FIG. 1, utilizing a distributed computing architecture. For the sake of reference, operations performed during the materialization process 600 may sometimes refer to components of the distributed computing architecture 400 shown in FIG. 4, but it should be understood that other suitable architectures may be used to perform the various operations discussed herein.

The changeset 610 may be the same as changeset 310 shown in FIG. 3. Changeset 610, for example, may be in with in columnar format, including a column representing the primary key (Key), with a number of data columns (Col1, Col2) and a column representing the type of event (eventType), e.g., insert, update, or delete. The incremental CDC data may include a relatively small amount of data, e.g., a few rows, or may contain a large amount of data, e.g., millions or rows, and for example, may be 20 GB in Avro compression format and 160 GB in memory.

The baseline data table 620 may be the same as the baseline data table 320 shown in FIG. 3. The baseline data table 620 is the table from the database (data lake) that includes previously acquired data (and is thus referred to as the baseline data), to which the changeset 610 is to be merged. The baseline data table 320 may include a large amount of data, e.g., 180 billion rows, and may include 8 TB stored in a compressed format, e.g., Parquet format, in the data lake and 80 TB in memory. The baseline data table 320, for example, may be in columnar format, including a column representing the primary key (Key), and a number of data columns (Col1, Col2, . . . . Col150). While baseline data table 320 illustrated data only in column col1, it should be understood that the baseline data table 320 may include data in each column of each row.

In the materialization process 600, at operation 601, the changeset 610 is read and the primary keys are extracted from the entire changeset 610, e.g., by the executors 442. As illustrated by the extracted primary keys 630, duplicative primary keys may be removed, e.g., if there are multiple changes to the same primary key in the changeset 610, only one instance of the primary key may be included in the extracted primary keys 630. Moreover, as illustrated by operation 602, the extracted primary keys 630 may be optionally compressed. For example, the extracted primary keys 630 may be represented in a trie data structure, as illustrated by table 635, or any other desired data structure that reduces memory. For example, the primary keys may often consist of multiple columns (composite keys), and some of the columns may be common between primary keys. Accordingly, a trie data structure may be used to reduce the total size of the extracted primary keys 630.

At operation 603, the extracted primary keys 630 are broadcast to each executor in the cluster, e.g., executors 442 in cluster 430. Broadcast, for example, allows a read-only variable to be cached on each machine rather than shipping a copy of it with tasks. Broadcast allows every executor 442 to receive a copy of the extracted primary keys 630 in an efficient manner, if the size of the extracted primary keys 630 is less than a hard limit for broadcasting, e.g., less than 8 GB for Apache Spark™. In some implementations, e.g., as discussed in FIG. 7 below, the extracted primary keys 630 may be broadcast iteratively in groups that are less than the hard limit for broadcasting and the executors may join (union) the iteratively broadcast groups of extracted primary keys to reproduce the dataframe for all of the extracted primary keys 630.

At operation 604, each executor reads the baseline data table 620 from the data lake, and filters the baseline data table into two different dataframes based on the extracted primary keys 630 received by broadcast at operation 603. The baseline data table 620 is filtered into a baseline match dataframe 640 and a baseline unmatched dataframe 645 based on the extracted primary keys 630. The resulting baseline match dataframe 640 includes only primary keys that match the primary keys in the extracted primary keys 630, i.e., the baseline match dataframe 640 includes only rows with an associated primary key that is present in the changeset 610. For example, as illustrated in FIG. 6, the baseline match dataframe 640 includes rows associated with primary keys pk2 and pk3 because they match primary keys in the extracted primary keys 630. It should be noted that primary key pk1 is not present in the baseline match dataframe 640, even though it is present in the extracted primary keys 630, because primary key pk1 does not exist in the baseline data table 620 and is an insert from the changeset 610. Thus, the baseline match dataframe 640 is a subset of the baseline data table 620 to which changes from the changeset 610 need to be merged.

In contrast, the resulting baseline unmatched dataframe 645 includes only primary keys that do not match any of the primary keys in the extracted primary keys 630, i.e., the baseline unmatched dataframe 645 includes only rows with an associated primary key that are not present in the changeset 610. For example, as illustrated in FIG. 6, the baseline unmatched dataframe 645 includes rows associated with primary keys pk4 and pk_180Billion because they do match primary keys in the extracted primary keys 630. Thus, the baseline unmatched dataframe 645 is a subset of the baseline data table 620 that does not include changes.

Because the size of the changeset 610 is significantly smaller than the size of the baseline data table 620, the resulting size of the baseline match dataframe 640, which includes only primary keys that are present in the changeset 610, will be less than 1% of the size of the baseline data table 620, and conversely, the resulting size of the baseline unmatched dataframe 645, which includes only primary keys that are not present in the changeset 610, will be more than 99% of the size of the baseline data table 620. Accordingly, the executors may merge the changes from the changeset 610 with the baseline match dataframe 640 without being required to perform a shuffle operation.

At operation 605, the changeset 610 may be partitioned and distributed to a number of executors. In some optional implementations, the changeset 610 may be partitioned and distributed to the executors, and the rows are consolidated and used further in the merge process. Consolidation of the changeset 610, for example, combines multiple entries associated with the same primary key into a single row, with the latest changes retained in each column. For example, in the changeset 610, primary key pk1 is associated with two changes, including an insert and an update to column col2, and primary key pk2 is associated with two changes, including two updates to column col2. The changeset 610 may be consolidated to produce consolidated changeset 615 to combine all entries associated with primary key pk1 combined into a single row with the latest update to column col2 remaining and eventType listed as insert, and all entries associated with primary key pk2 combined into a single row with the latest update to column col2 remaining and eventType listed as update. Through consolidation, the size of the consolidated changeset 615 may have a significantly smaller size in memory compared to the changeset 610, e.g., 150 GB for consolidated changeset 615 compared to 180 GB for changeset 610.

After partitioning and distributing the consolidated changeset 615, each executor will have the baseline matched dataframe 640 (as well as the baseline unmatched dataframe 645) and a different portion of the consolidated changeset 615. At operation 606, each executor may then use the simple merge logic to merge the changes from its the respective portion of the consolidated changeset 615 to the baseline match dataframe 640. For example, as discussed in reference to FIG. 3, each executor may union (join) its respective portion of the changeset with the baseline matched dataframe 640 and order the combined data by the primary key, for example, by performing a reduceByKey operation on the combined dataset in Apache Spark™. The merge logic for multiple rows with the same primary key may then be applied, e.g., apply the update to the baseline row, including applying the latest values from the update row to the baseline row (if consolidation of the changeset 610 has not already been performed) and merge the rows. For a delete row, the row is made null and filtered out. For inserts in changeset, nothing needs to be done as the union dataframe will only have one row for the insert primary key. Each executor thus produces a merged dataframe 650 that is the baseline matched dataframe 640 merged with changes from the changeset, sometimes referred to herein as a baseline change dataframe 650.

At operation 607, the baseline change dataframe 650 from each executor is combined with the remaining unchanged data from the baseline unmatched dataframe 645 to produce a final changed baseline data table 660, which is then written to S3 and stored in the data lake.

With the materialization process 600 illustrated in FIG. 6, the size of the baseline data table used for merging the changeset is greatly reduced by broadcasting the extracted primary keys 630 and filtering the baseline data table 620 to produce the baseline matched dataframe 640. Accordingly, the shuffle operation may be avoided, thereby improving efficiency, and reducing time and resources required to perform the merging operation.

Distributed computing architectures, such as Apache Spark™, however, may have a hard limit to the size of a dataframe, e.g., 8 GB, that may be broadcast. If the dataframe for the extracted primary keys 630 is greater than 8 GB, the entire list of primary keys from the changeset may not be broadcast. Accordingly, the materialization process 600 may employ a limit to the size of the changeset that may be processed (bytesToProcess), e.g., to less than 8 GB of extracted primary keys. If the changeset results is larger than the limit, the materialization process 600 may be performed multiple times for different portions of the changeset (each portion being less than the limit of 8 GB of extracted primary keys).

Performing the materialization process 600 multiple times, however, may be expensive and may require manual effort to ensure the changeset has an extracted primary key dataframe that is within the broadcast limit size. Moreover, there is a risk of missing agreed upon service times per service-level agreements (SLAs), e.g., during a busy period and when there is a data burst because of a source's changes to their data lake. In order to scale the batch materialization process 600, it may be desirable to resolve the 8 GB broadcast limitation for processing the changeset 610.

In accordance with some implementations, the 8 GB broadcast limitation may be resolved by iteratively broadcasting the extracted primary keys. Moreover, in some implementations, a dynamic resource estimation for the job may be performed to assist in the iterative broadcasting of the extracted primary keys.

Figure 7:
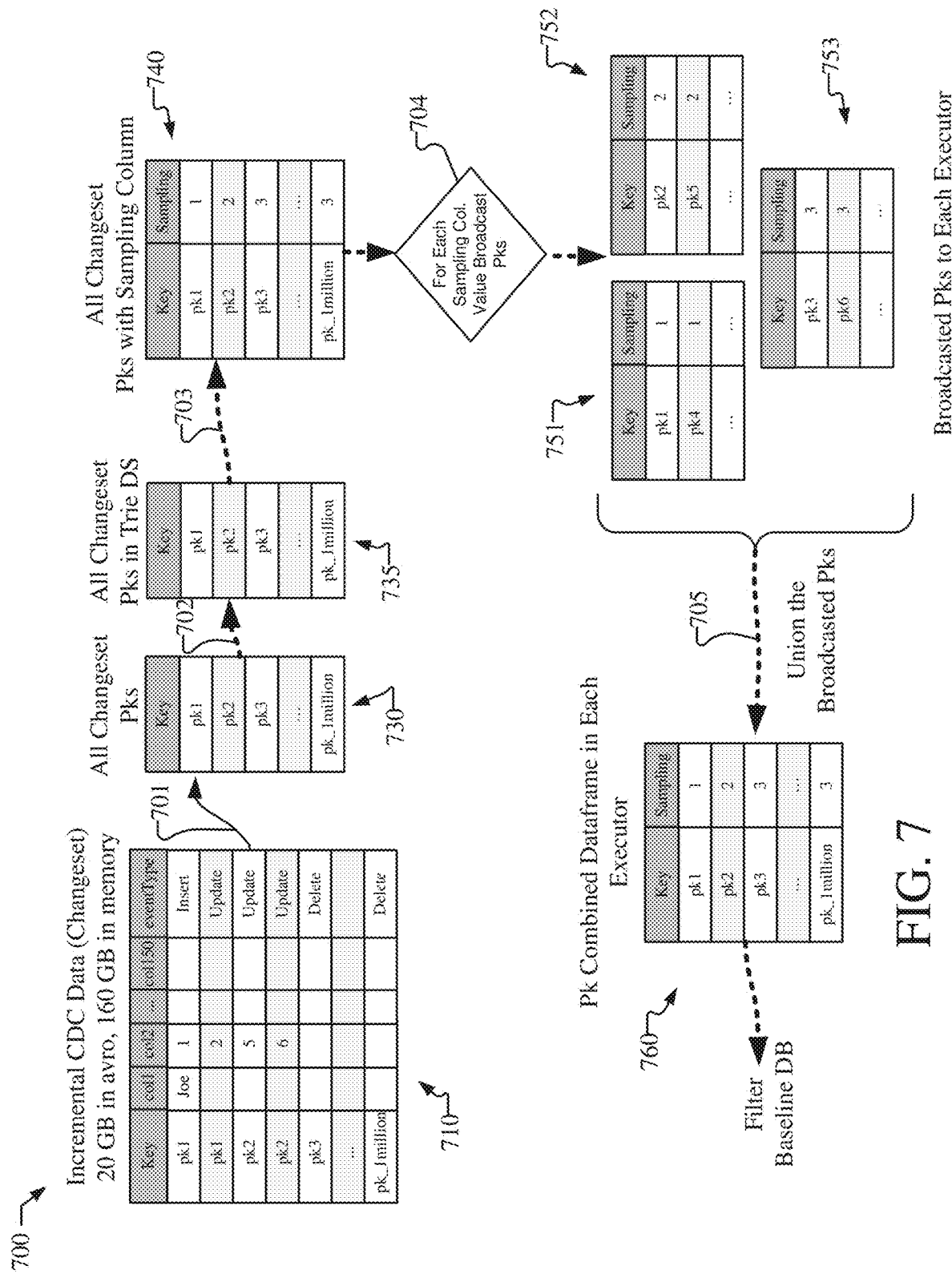
FIG. 7 shows an illustration of an iterative broadcast process that may be used with a materialization process, in accordance with aspects of the present disclosure.

FIG. 7 is an illustration of an iterative broadcast process 700 that may be used with a materialization process, in accordance with aspects of the present disclosure. The iterative broadcast process 700, for example, may be implemented in the materialization process 600 from FIG. 6. For the sake of reference, operations performed during the iterative broadcast process 700 may sometimes refer to components of the distributed computing architecture 400 shown in FIG. 4, but it should be understood that other suitable architectures may be used to perform the various operations discussed herein.

The iterative broadcast process 700 is performed with a changeset 710, which may be the same as changeset 310 shown in FIG. 3 or changeset 610 shown in FIG. 6. As with changeset 310 and 610, changeset 710 may be in with in columnar format, including a column representing the primary key (Key), with a number of data columns (Col1, Col2) and a column representing the type of event (eventType), e.g., insert, update, or delete. The incremental CDC data may include a relatively small amount of data, e.g., a few rows, or may contain a large amount of data, e.g., millions or rows, and for example, may be 20 GB in Avro compression format and 160 GB in memory.

Similar to operation 601 in the materialization process 600 shown in FIG. 6, at operation 701, the changeset 710 is read and the primary keys are extracted from the entire changeset 710 to produce a dataframe of the extracted primary keys 730, e.g., by the driver 410 in the distributed computing architecture 400 shown in FIG. 4. Moreover, as illustrated by operation 702, the extracted primary keys 730 may be optionally compressed. For example, the extracted primary keys 730 may be represented in a trie data structure, as illustrated by table 735, or any other desired data structure that reduces memory. For example, the primary keys may often consist of multiple columns (composite keys), and some of the columns may be common between primary keys. Accordingly, a trie data structure may be used to reduce the total size of the extracted primary keys 730.

At operation 703, groups of the extracted primary keys are generated, e.g., using a sampling column (Sampling), where each group of the extracted primary keys has a size that is less than a broadcast limit to the plurality of executors. For example, a sampling column (Sampling) is added to the extracted primary keys 730, e.g., by the driver 410, to produce a dataframe 740 with primary keys and associated sampling column. The values in the sampling column may be based on the dataframe size of the extracted primary keys 730, e.g., after placed in a trie data structure if used. The sampling column is used to enable iteratively broadcasting the extracted primary keys 730 in groups that are less than the hard limit for broadcasting, e.g., less than 8 GB. The sampling values in the sampling column, for example, may be added by performing a hash of the primary key (hash(pk)) modulo the total number of groups that will be iterative broadcast (samplingTotal). The primary keys with congruence of the hash value modulo the samplingTotal will have the same sampling value and will be broadcast in the same group. With proper selection of the sampling Total, the sampling column defines groups of extracted primary keys that is less than the size of the broadcast limit to the plurality of executors, and each group may be the same size.

At operation 704, the extracted primary keys are iteratively broadcast based on the sampling value. For example, a dataframe 751 with extracted primary keys associated with a sampling value of 1 is broadcast, followed by the broadcast of a dataframe 752 with extracted primary keys associated with a sampling value of 2, and the broadcast of a dataframe 753 with extracted primary keys associated with a sampling value of 3, etc., until all extracted primary keys have been broadcast. Each broadcast of the extracted primary keys based on the sampling value will have a size that is less than the broadcast hard limit, e.g., 8 GB, thereby resolving the hard limit limitation.

At operation 705, after all extracted primary key dataframes (e.g., dataframes 751, 752, and 753) have been broadcast to all executors, each executor will perform a union operation to combine the dataframes, thereby producing a combined dataframe 760 of the extracted primary keys.

After each executor has obtained the combined dataframe 760 of the extracted primary keys, each executor may read the baseline data table from the data lake and filter the baseline data table into a baseline matched dataframe and baseline unmatched dataframe based on the extracted primary keys 760, as discussed at operation 604 in FIG. 6. The remainder of the materialization process may be performed as discussed in FIG. 6.

In some implementations, a dynamic resource estimation may be performed before starting the job. Dynamic resource estimation is performed to ensure that each executor will have sufficient memory to hold the broadcast extracted primary keys and to hold the baseline table for processing. By way of example, typically each executor has 16 GB of memory and 5 cores per executor. For the present algorithm, the required executor size may be estimated to be twice that of total dataframe for the extracted primary keys.

Because it is desirable to estimate the number of executors prior to starting the job, a historic run may be used to estimate the memory requirements. For example, from previous runs, the changeset size, the number of primary keys, and the size of the dataframe for the extracted primary keys may be known. Accordingly, for a current run, a regression based algorithm may be used to estimate the number of primary keys for a given changeset size for a given table and pipeline. For example, for a given number of primary keys, the size of the dataframe for the extracted primary key may be extrapolated. The required executor memory may be twice the estimated dataframe size for the extracted primary keys. Moreover, with five cores typically assigned for 16 GB, the number of cores per executor may be determined based on the required executor memory times 5/16.

From previous runs, the partitions of the baseline data table may be saved, e.g., where partitions are based on the size of table and number of files. If there are 10K partitions in baseline data table, and tasks to run in parallel is 10%, then 10K/10=1000 cores are needed. The total number of executors is based on the tasks to run in parallel divided by the number of cores per executor. Based on the executor memory, total number of executors, and the number of cores per executor, the amount of memory and CPU core requirements may be determined. Thus, the node type and number of nodes may be determined and based on this, the cluster with appropriate number of executors and cores may be launched in advance.

With the iterative broadcast process 700, there is no issues with the broadcast limit size, thereby eliminating associated issues, such as SLA breaches during a busy period or a data burst.

Figure 8:
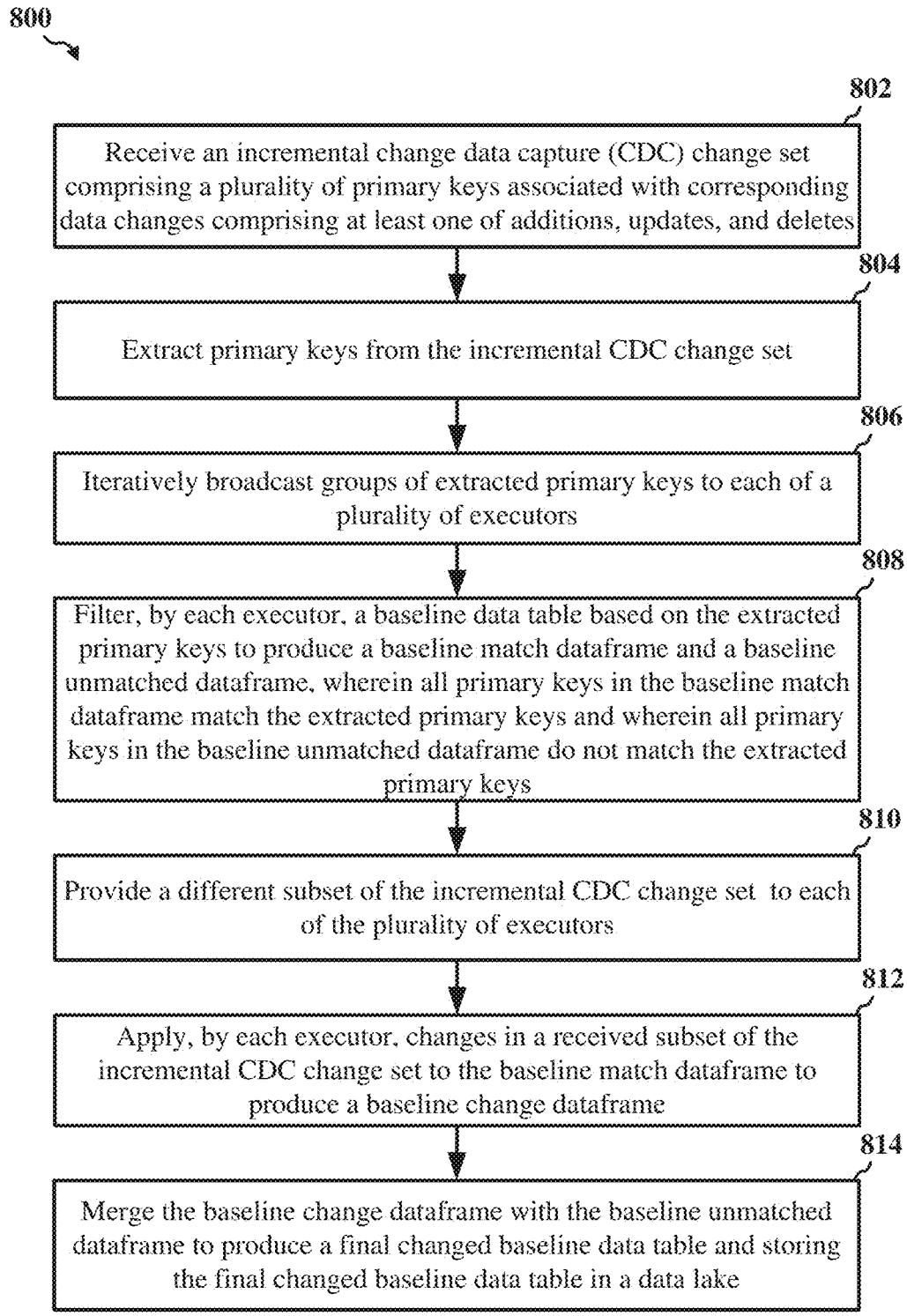
FIG. 8 shows an illustrative flowchart depicting an example method for a batch materialization using broadcast, in accordance with aspects of the present disclosure.

FIG. 8 shows an illustrative flowchart depicting an example method 800 for a batch materialization using broadcast, in accordance with aspects of the present disclosure. The example method 800 is described as a computer-implemented method, e.g., performed by the computing system 110 illustrated in FIG. 1, e.g., implementing the distributed computing architecture 400 shown in FIG. 4 as part of an ingestion platform 200 shown in FIG. 2. Various operations of method 800 may sometimes refer to one or more of FIGS. 1-7, for the sake of example, but it should be understood that operations are not specifically limited to the components referred and that other suitable components may be used to perform the various operations discussed herein.

At 802, an incremental change data capture (CDC) changeset is received, which includes a plurality of primary keys associated with corresponding data changes that include at least one of additions, updates, and deletes, e.g., as illustrated by changeset 610 in FIG. 6.

At 804, primary keys are extracted from the incremental CDC changeset, e.g., as illustrated by operation 601 to produce the dataframe for the extracted primary keys 630 in FIG. 6 and at operation 701 to produce the dataframe for the extracted primary keys 730 in FIG. 7.

At 806, groups of extracted primary keys are iteratively broadcast to each of a plurality of executors, e.g., as illustrated by operation 603 in FIG. 6 and at operation 704 to produce the dataframes for the extracted primary keys 751, 752, 753 in FIG. 7.

At 808, a baseline data table is filtered, by each executor, based on the extracted primary keys to produce a baseline match dataframe and a baseline unmatched dataframe, where all primary keys in the baseline match dataframe match the extracted primary keys and all primary keys in the baseline unmatched dataframe do not match the extracted primary keys, e.g., as illustrated by operation 604 to produce baseline match dataframe 640 and baseline unmatched dataframe 645, respectively, in FIG. 6.

At 810, a different subset of the incremental CDC changeset is provided to each of the plurality of executors, e.g., as illustrated by operation 605 in FIG. 6.

At 812, changes in a received subset of the incremental CDC changeset are applied, by each executor, to the baseline match dataframe to produce a baseline change dataframe, e.g., as illustrated by operation 606 to produce the merged dataframe 650 in FIG. 6.

At 814, the baseline change dataframe is merged with the baseline unmatched dataframe to produce a final changed baseline data table and the final changed baseline data table is stored in a data lake, e.g., as illustrated by operation 607 to produce the final changed baseline data table 660 in FIG. 6.

In some implementations, the extracted primary keys are represented in a trie data structure, where the extracted primary keys represented in trie data structure are iteratively broadcast to each of the plurality of executors, e.g., as illustrated by operation 602 to produce the dataframe of extracted primary keys in trie DS 635 and operation 603 in FIG. 6 and at operation 702 to produce the dataframe of extracted primary keys in trie data structure 735 and operation 704 to produce the dataframes for the extracted primary keys 751, 752, 753, and 760 in FIG. 7.

In some implementations, the method 800 may further include generating the groups of the extracted primary keys, where each group of the extracted primary keys has a size that is less than a broadcast limit to the plurality of executors, e.g., as illustrated by operation 703 to produce the dataframe 740 with primary keys and associated sampling column in FIG. 7. In some implementations, each group of the extracted primary keys may have a same size, e.g., as discussed in operation 703 in FIG. 7. In some implementations, the groups of the extracted primary keys may be generated based on congruence of a hash value of each primary key modulo a number of the groups of the extracted primary keys, e.g., as discussed in operation 703 in FIG. 7.

In some implementations, the method 800 may further include combining, by each of a plurality of executors, the groups of the extracted primary keys into a full list of extracted primary keys, e.g., as discussed at operation 705 to produce the combined dataframe 760 of the extracted primary keys in FIG. 7.

In some implementations, the method 800 may further include estimating a memory requirement for the batch materialization, and determining a number of executors to be used for the batch materialization based on the memory requirement, where the plurality of executors is the number of executors, e.g., as discussed in reference to the dynamic resource estimation.

In some implementations, the method 800 may further include consolidating rows in the incremental CDC changeset before providing the different subset of the incremental CDC changeset to each of the plurality of executors, e.g., as illustrated by operation 605 and the consolidated changeset 615 in FIG. 6.

In some implementations, applying, by each executor, the changes in the received subset of the incremental CDC changeset to the baseline match dataframe to produce the baseline change dataframe may include generating a combined dataset by performing a union with the received subset of the incremental CDC changeset and the baseline match dataframe, aggregating values associated with each primary key, and performing at least one of additions, updates, and deletes from the received subset of the incremental CDC changeset to produce the baseline change dataframe, e.g., as discussed in reference to operation 606 to produce the merged dataframe 650 in FIG. 6.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the broadest scope consistent with this disclosure, the principles and the novel features disclosed herein.

What is claimed is:

1. A method performed by a computer system configured for batch materialization, the method comprising:
   receiving an incremental change data capture (CDC) changeset comprising a plurality of primary keys associated with corresponding data changes comprising at least one of additions, updates, and deletes;
   extracting primary keys from the incremental CDC changeset;
   iteratively broadcasting groups of extracted primary keys to each of a plurality of executors;
   filtering, by each executor, a baseline data table based on the extracted primary keys to produce a baseline match dataframe and a baseline unmatched dataframe, wherein all primary keys in the baseline match dataframe match the extracted primary keys and wherein all primary keys in the baseline unmatched dataframe do not match the extracted primary keys;
   providing a different subset of the incremental CDC changeset to each of the plurality of executors;
   applying, by each executor, changes in a received subset of the incremental CDC changeset to the baseline match dataframe to produce a baseline change dataframe; and
   merging the baseline change dataframe with the baseline unmatched dataframe to produce a final changed baseline data table and storing the final changed baseline data table in a data lake.

2. The method of claim 1, further comprising representing the extracted primary keys in a trie data structure, wherein the extracted primary keys represented in the trie data structure are iteratively broadcast to each of the plurality of executors.

3. The method of claim 1, further comprising generating the groups of the extracted primary keys, wherein each group of the extracted primary keys has a size that is less than a broadcast limit to the plurality of executors.

4. The method of claim 3, wherein each group of the extracted primary keys has a same size.

5. The method of claim 3, wherein the groups of the extracted primary keys are generated based on congruence of a hash value of each primary key modulo a number of the groups of the extracted primary keys.

6. The method of claim 1, further comprising combining, by each of a plurality of executors, the groups of the extracted primary keys into a full list of extracted primary keys.

7. The method of claim 1, further comprising:
   estimating a memory requirement for the batch materialization; and
   determining a number of executors to be used for the batch materialization based on the memory requirement;
   wherein the plurality of executors comprises the number of executors.

8. The method of claim 1, further comprising consolidating rows in the incremental CDC changeset before providing the different subset of the incremental CDC changeset to each of the plurality of executors.

9. The method of claim 1, wherein applying, by each executor, the changes in the received subset of the incremental CDC changeset to the baseline match dataframe to produce the baseline change dataframe comprises:

generating a combined dataset by performing a union with the received subset of the incremental CDC changeset and the baseline match dataframe;

aggregating values associated with each primary key; and performing at least one of additions, updates, and deletes from the received subset of the incremental CDC changeset to produce the baseline change dataframe.

10. A computer system configured for batch materialization, comprising:

one or more processors; and a memory communicatively coupled with the one or more processors and storing instructions that, when executed by the one or more processors, causes the computer system to:

receive an incremental change data capture (CDC) changeset comprising a plurality of primary keys associated with corresponding data changes comprising at least one of additions, updates, and deletes;

extract primary keys from the incremental CDC changeset;

iteratively broadcast groups of extracted primary keys to each of a plurality of executors;

filter, by each executor, a baseline data table based on the extracted primary keys to produce a baseline match dataframe and a baseline unmatched dataframe, wherein all primary keys in the baseline match dataframe match the extracted primary keys and wherein all primary keys in the baseline unmatched dataframe do not match the extracted primary keys;

provide a different subset of the incremental CDC changeset to each of the plurality of executors;

apply, by each executor, changes in a received subset of the incremental CDC changeset to the baseline match dataframe to produce a baseline change dataframe; and merge the baseline change dataframe with the baseline unmatched dataframe to produce a final changed baseline data table and store the final changed baseline data table in a data lake.

11. The computer system of claim 10, wherein the computer system is further configured to represent the extracted primary keys in a trie data structure, wherein the extracted primary keys represented in the trie data structure are iteratively broadcast to each of the plurality of executors.

12. The computer system of claim 10, wherein the computer system is further configured to generate the groups of the extracted primary keys, wherein each group of the extracted primary keys has a size that is less than a broadcast limit to the plurality of executors.

13. The computer system of claim 12, wherein each group of the extracted primary keys has a same size.

14. The computer system of claim 12, wherein the groups of the extracted primary keys are generated based on congruence of a hash value of each primary key modulo a number of the groups of the extracted primary keys.

15. The computer system of claim 10, wherein the computer system is further configured to combine, by each of a plurality of executors, the groups of the extracted primary keys into a full list of extracted primary keys.

16. The computer system of claim 10, wherein the computer system is further configured to:

estimate a memory requirement for the batch materialization; and determine a number of executors to be used for the batch materialization based on the memory requirement;

wherein the plurality of executors comprises the number of executors.

17. The computer system of claim 10, wherein the computer system is further configured to consolidate rows in the incremental CDC changeset before providing the different subset of the incremental CDC changeset to each of the plurality of executors.

18. The computer system of claim 10, wherein the computer system is configured to apply, by each executor, the changes in the received subset of the incremental CDC changeset to the baseline match dataframe to produce the baseline change dataframe by being configured to:

generate a combined dataset by performing a union with the received subset of the incremental CDC changeset and the baseline match dataframe;

aggregate values associated with each primary key; and perform at least one of additions, updates, and deletes from the received subset of the incremental CDC changeset to produce the baseline change dataframe.

\* \* \* \* \*